United States Patent [19]

Oyague et al.

[11] Patent Number: 5,968,472
[45] Date of Patent: Oct. 19, 1999

[54] PRODUCTION PROCESS OF HYDROGEN PEROXIDE BY OXIDATION OF SECONDARY ALCOHOLS WITH MOLECULAR OXYGEN IN LIQUID PHASE

[75] Inventors: Juan Antonio Delgado Oyague; Pilar De Frutos Escrig; Ana Padilla Polo, all of Madrid, Spain

[73] Assignee: Repsol Quimica S.A., Madrid, Spain

[21] Appl. No.: 08/960,857

[22] Filed: Oct. 30, 1997

[30] Foreign Application Priority Data

Oct. 30, 1996 [ES] Spain ..................................... 9602301

[51] Int. Cl.$^6$ ................................................. C01B 15/026
[52] U.S. Cl. .............................................................. 423/591
[58] Field of Search ............................................. 423/591

[56] References Cited

U.S. PATENT DOCUMENTS

| | | | |
|---|---|---|---|
| 2,479,111 | 8/1949 | Harris | ........................................ 423/591 |
| 2,869,989 | 1/1959 | Keeler et al. . | |
| 2,871,102 | 1/1959 | Rust . | |
| 2,871,103 | 1/1959 | Skinner et al. . | |
| 2,871,104 | 1/1959 | Rust . | |
| 3,156,531 | 11/1964 | Luten, Jr. et al. . | |
| 3,294,488 | 12/1966 | Dunlop et al. . | |
| 4,303,632 | 12/1981 | Gosser . | |
| 4,897,252 | 1/1990 | Cochran et al. . | |
| 4,975,266 | 12/1990 | Albal et al. . | |
| 5,254,326 | 10/1993 | Leyshon et al. | ........................ 423/591 |

FOREIGN PATENT DOCUMENTS

| | | | |
|---|---|---|---|
| 560133 | 7/1958 | Canada | .................................... 423/591 |
| 758907 | 10/1956 | United Kingdom . | |
| 759464 | 10/1956 | United Kingdom | .................... 423/591 |

OTHER PUBLICATIONS

Milas, et al., "Studies in Organic Peroxides. XXVI. Organic Peroxides Derived from Acetone and Hydrogen Peroxide," *J. Am. Chem. Soc.*, vol. 81, pp. 6461–6462 (1959).

D. Swern, ed., *Organic Peroxides*, (New York: Wiley Interscience 1970), vol. I, p. 26.

Letters ("Handling Hazardous Chemicals," "Nominal and Actual Molarity," "Thanks to Younger Chemists"), *Chemical and Engineering News*, p. 4, Nov. 19, 1984.

Schwoegler, Letter entitled "Shock Sensitivity of Acetone Peroxides," *Chemical and Engineering News*, p. 4, Jan. 7, 1985.

Mackenzie, "Hydrogen Peroxide Without Accidents," *Chem. Eng.*, Jun. 1990, pp. 84–90.

*Primary Examiner*—Wayne Langel
*Attorney, Agent, or Firm*—Ladas & Parry

[57] ABSTRACT

Improved procedure for the production of hydrogen peroxide by oxidation with molecular oxygen of secondary alcohols admixed with primary alcohols and/or ethers.

28 Claims, No Drawings

PRODUCTION PROCESS OF HYDROGEN PEROXIDE BY OXIDATION OF SECONDARY ALCOHOLS WITH MOLECULAR OXYGEN IN LIQUID PHASE

1. FIELD OF THE INVENTION

The present invention relates to hydrogen peroxide production via secondary alcohol oxidation with molecular oxygen.

2. DESCRIPTION OF THE PRIOR ART

The hydrogen peroxide is a commercial chemical produced in large scale for its use in numerous applications. The most commercially used process for the hydrogen peroxide production includes the antrahydroquinone oxidation, hydrogen peroxide extraction and reduction of the antraquinone resulting from to yield antrahydroquinone. This process requires high investments and implies the use of solvents with efficient recycling of several process flows.

Considerable efforts for developing processes which imply the direct reaction of hydrogen and oxygen have been made, but until now this type of processes have not achieved an important commercial acceptance.

It is known that the hydrogen peroxide is also formed by secondary alcohol oxidation. The isopropanol oxidation yields mixtures of organic and hydrogen peroxide (see J. Am. Chem. Soc. 83, 6461 (1959); U.S. Pat. Nos. 2,869,989, 3,156,531 3,294,488 and Brit. 758,907). Other secondary alcohols which have been mentioned as possible starting materials for the hydrogen peroxide production include 1-phenylethanol, and cyclohexanol; see for example the U.S. Pat. No. 2,871,102 4. Likewise, in U.S. Pat. Nos. 5,254,326, 4,975,266 and 4,897,252 the hydrogen peroxide production by oxidation in liquid phase of 1-phenylethanol with molecular oxygen is described.

Also the hydrogen peroxide is formed by oxidation of high boiling point secondary alcohols such as diaryl methanols wherein the hydrogen peroxide is isolated in vapour form from the reaction mixture; see U.S. Pat. No. 4,303,632.

3. SUMMARY OF THE INVENTION

The present invention relates to an improved procedure for the hydrogen peroxide production by oxidation of secondary alchols. Particularly the procedure object of this invention relates to the production of hydrogen peroxide by oxidation with liquid-phase molecular oxygen of secondary alcohols admixed with primary alcohols and/or others.

4. DESCRIPTION OF THE INVENTION

According to the teachings of the prior art, the oxidation of secondary alcohols with molecular oxygen for jointly producing hydrogen peroxide with the corresponding ketone under suitable pressure and temperature conditions from the industrial point of view, is accompanied by secondary reactions which reduce the selectivity to the desired hydrogen peroxide. Hence, a desirable object for the improvement of this type of processes is to increase the selectivity to hydrogen peroxide in the common reaction conditions avoiding its decomposition or its reaction with the reactants, i.e., with the secondary alcohols used as starting materials or with the ketones produced in the reaction.

Another desirable object is to enhance the reaction rate sine that may assume the decrease of the reaction equipment size and, therefore, of the investment necessary to carry out the process at a commercial scale. The increase of the reaction rate may be achieved by elevating the reaction temperature but at the expense of the decrease of the selectivity to hydrogen peroxide and of the increase of the operation risk. It is known that all the hydrogen peroxide solutions show a certain degree of instability. Therefore, it is extremely important to avoid decomposition of the hydrogen peroxide when it is handled since the gas and heat (−98.3 KG mol$^{-1}$) production may cause safety problems. It is known that the decomposition rate of the hydrogen peroxide increases by a factor of approximately 2–3 for each 10° C. of temperature elevation. The inherent risks to the production and handling of hydrogen peroxide in the presence of organic compounds are described for example in the following publications: Swern "Organic Peroxides", Wiley Interscience, New York 1970, p. 26; Daane, Chemical and Engineering News, page 4, Nov. 19, 1984; Schwoegler, Chemical and Engineering News, page 4, Jan. 7, 1985; Mackenzie, Chem. Eng. June 1990 p. 84–90. Therefore the reaction temperature elevation is undesirable due to the decrease of the selectivity to hydrogen peroxide and due to obvious safety reasons. Another possibility of increasing the reaction rate is to increase the oxygen partial pressure in the reactor. Obviously also the increase of the pressure supposes putting up the price of the equipments without achieving the desirable selectivity levels to hydrogen peroxide. Therefore, according to the real art it is not possible to simultaneously achieve high reaction rates and selectivities to hydrogen peroxide.

Accordingly, the real technique feels a need to develop secure procedures which simultaneously allow to increase the oxidation rate of the secondary alcohols with molecular oxygen and the selectivity to hydrogen peroxide of this reaction. Surprisingly it has been found that these two objectives may be simultaneously achieved within the range of the present invention when the liquid phase secondary alcohol oxidation with molecular oxygen is carried out admixed with primary alcohols and/or ethers. In this way, at a given temperature the oxidation rate of the secondary alcohols and the selectivity are substantially enhanced regarding the formation of the hydrogen peroxide. This phenomenon is surprising and totally unexpected since the secondary alcohols concentrations in the mixtures is lower than that of the pure secondary alcohols and, nevertheless, the oxidation rates of the secondary alcohols in the mixtures are clearly higher than those of the pure secondary alcohols. Without wishing to bond to any theory, these results seem to show that the primary alcohols and/or the added ethers inhibit the hydrogen peroxide decomposition and promote the propagation of the reaction without increasing the end-finishing reaction, i.e., they increase the oxidability, $k_p/k_t^{1/2}$, of the secondary alcohols. This enhancement of the oxidation rate of the secondary alcohols and of the selectivity to hydrogen peroxide which are achieved according to the invention assume a great advantage from the technical point of view versus the present processes. When in the process according to the invention primary alcohols and/or ethers which do not contain tertiary hydrogen atoms or benzylic hydrogen atoms within their molecules are used, these compounds do not significantly oxidize in the common conditions which is carried out the oxidation of the secondary alcohols and therefore they may be considered as practically inert solvents.

According to the present invention the secondary alcohols admixed with primary alcohols and/or ethers are oxidized in liquid phase with molecular oxygen at moderate temperature.

The oxidant used in the present invention is the molecular oxygen. The air is the suitable source of oxygen although pure oxygen, oxygen enriched air, air diluted with nitrogen, and oxygen diluted in different inert compounds such as argon, carbon dioxide, etc. may be used.

The temperature and pressure conditions must be chosen to substantially maintain the reaction mixture in liquid phase. Moderate temperatures between around 60 and 160° C., preferably 80–140° C. are used to achieve acceptable reaction rates and selectivities to hydrogen peroxide.

It is important to operate with oxygen partial pressures sufficiently high to achieve reasonable reaction rates. The partial pressure of the oxygen in the feeding gases must be comprised between approximately 0.3 and 15 kg/cm², more preferably between 0.2 and 5 kg/cm².

The overall pressure in the reaction area must be sufficient to maintain the reaction mixture in liquid phase.

Generally pressures comprised between 1 and 40 kg/cm² and preferably between 2 and 30 kg/cm² are useful.

In the reaction area is must be avoided the presence of metallic contaminants of other products which promote the peroxide decomposition. Also known peroxide stabilizing agents may be used such as alkaline metal salts and hydroxides, sodium stannate, sodium pyrophosphate, organic phosphonates, ethylenediaminotetraacetic acid (EDTA), dipicolinic acid, benzoic acid, aminotri (methylenephosphonic) acid, 1-hydroxyethylidene-1,1-diphosphonic acid, ethylenediaminetetra (methylenephosphonic) acid, pyrophosphoric acid and/or their salts, etc.

The oxidation of secondary alcohols with molecular oxygen to produce hydrogen peroxide is an exothermic reaction which requires the removal of the reaction heat. This may be achieved for example circulating a portion of the reaction mixture through a heat exchanger.

Alternatively, the heat may be removed by partial evaporation and condensation of the components of the reaction mixture.

The secondary alcohols which may be oxidized to ketones and hydrogen peroxide according to the invention include organic compounds which contain at least one carbon atom bonded to a hydrogen atom, to a hydroxy group and to two organic radicals of general formula

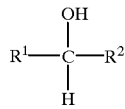

where $R^1$ and $R^2$ are alkyl, arylalkyls (that is alkyl groups substituted with aryl groups) and/or aryl groups, being the same or different. Between the preferred alkyl groups are the $C_1$–$C_6$ groups such as methyl, ethyl, propyl, n-butyl, isobutyl, terbutyl, n-pentyl, isopentyl, 1-methylbutyl, 1-ethylpropyl, neopentyl, terpentyl, n-hexyl, isohexyl, etc. Among the preferred aryl groups are the $C_6$–$C_{18}$ aryl groups such as phenyl, nitrophenyl, chlorophenyl, methoxyphenyl, methylphenyl, dimethylphenyl, trimethylphenyl, naphthyl, naphthylphenyl, biphenyl, etc. The preferred arylalkyl groups include $C_7$–$C_{20}$ arylalkyl groups such as benzyl and phenylethyl. The $R^1$ and $R^2$ substituents must be chosen in such a way that they do not interfere in the oxidation reaction with the molecular oxygen and preferably they may not contain tertiary carbon atoms.

Exemplary of secondary alcohols which may be oxidized to hydrogen peroxide and ketones according to the invention are the aliphatic alcohohls, e.g. 2-propanol, 2-butanol, 2- and 3-pentanol, 2 and 3-hexanol, 2-, 3- and 4-octanols, 3,3'-dimethylbutanol-2, etc. and the aromatic alcohols such as diphenylmethanol, 1-phenylethanol, 1-phenylpropanol, 1-phenylpropanol-2, 1-phenylbutanol, 1-phenylbutanol-2, 4-phenylbutanol-2, etc.

Between the primary alcohols which may be used in the present invention, the linear $C_2$–$C_{16}$ primary aliphatic monoalcohols such as ethanol, 1-propanol, 1-butanol, 1-pentanol, 1-hexanol, 1-octanol and 1-hexadecanol, the branched $C_4$–$C_{16}$ primary aliphatic monoalcohols such as 2-methylpentanol, 2,2-dimethylpropanol, 3-methylbutanol, 2-ethylhexanol, 2,2,4-trimethylpentanol, the aromatic alcohols such as 2-phenylethanol, 2- and 3-phenylpropanol and the diols and polyols such as 1,4-butanodiol, 1,6-hexanodiol, 1,1,1-tris(hydroxymethyl)propane, etc. are included.

The ethers may be used in the range of the present invention are the aliphatic ethers such as diethyl ether, di-n butyl ether, etc. the ethyleneglycol ethers, diethyleneglycol ethers and triethyleneglycol ethers such as ethyleneglycol dipropylether, ethyleneglycol dihexylether, ethyleneglycol diphenylether, diethyleneglycol dimethylether, diethyleneglycol dibutylether, triethyleneglycol dimethylether, triethyleneglycol dibutylether, etc., the propyleneglycol ethers, dipropyleneglycol ethers and tripropyleneglycol ethers such as propyleneglycol diphenylether, dipropyleneglycol diethylether, tripropyleneglycol dimethylether, etc., the cyclic ethers such as tetrahydrofuran, dioxane, 1,3-dioxolane as well as their alkyl and aryl derivatives, the crown ethers, the aromatic ethers, for example the dibenzyl ether and its alkyl and aryl derivatives, etc. Likewise, polymeric ethers such as poly(ethylene oxide), poly (propylene oxide) and poly(ethylene oxide-co-propylene oxide) may be advantageously used in the range of the present invention. Also ethers which contain other functional groups in their molecule may be used advantageously, which are stable in the oxidation conditions of the secondary alcohols. In these groups, ethers containing functional groups of primary alcohol types such as 2-ethoxyethanol, 2-(2-ethoxyethoxy)ethanol, etc. and the ester groups containing ethers such as diethyleneglycol diacetate, diethyleneglycol monoacetate, triethyleneglycol benzoate, etc. are included.

The weight ratio of secondary alcohol/primary alcohol and/or ether which may be used in each case is not critical. The optimal ratio depends upon the selected alcohol and ethers nature and anyone skilled in the art can determine it easily in each case. In general it can be said that this weight ratio is between approximately 90/10 and 10/90 and more preferably between 85/15 and 30/70.

The isolation and purification of the hydrogen peroxide from the reaction mixtures may be carried out according to known procedures. Nevertheless these operations are considerably simplified within the range of the invention as consequence of the considerable reduction in the byproduct amount which is formed during the oxidation reaction due to higher selectivities and to higher concentrations of hydrogen peroxides which may be attained in the reaction medium.

From the above description anyone skilled may easily set the essential features of this invention and without separating from its scope carry out several changes and modifications of the invention to adapt it to the different secondary alcohol oxidation, admixed with different primary alcohols and/or ethers in different reaction conditions, depending on the desired reaction rates and selectivities to hydrogen peroxide.

The following examples illustrate the process of the invention without assuming any limitations to it.

The selectivity values to hydrogen peroxide and the relative oxidation rates which are included in the examples are defined in the following way:

Selectivity to $H_2O_2$(%)=(formed $H_2O_2$ moles/converted secondary alcohol moles).100

Relative rate=Oxidation rate of the secondary alcohol admixed with primary alcohols and/or ethers/oxidation rate of pure secondary alcohol in the same conditions.

EXAMPLES I TO II

These examples relate to the oxidation of 1-phenylethanol at atmospheric pressure in liquid phase in mixture with different primary alcohols and ethers according to the invention in comparison with the oxidation of 1-phenylethanol according the prior art (in absence of primary alcohols and/or ethers).

The oxidation was carried out in a 250 ml glass reactor, equipped with a thermometer and wit a stirring system. The flask was immersed in a thermostated bath in order to maintain the reaction temperature constant, 115° C. Before starting the assay, the secondary alcohol or the mixtures of secondary alcohols and primary alcohols and/or ethers were heated to the selected reaction temperatures. Once this temperature was reached, the injection of air was started by bubbling with a flow of 15.5 l/h; and the reaction time was started. The hydrogen peroxide concentration in the reaction medium was determined by iodometric titration. The analysis of the remaining reaction products was carried out by gas chromatography.

The results of the assays are shown in table 1. The oxidation of pure 1-phenylethanol (in absence of primary alcohols and/or ethers) according to the prior art is included as comparison.

It can be clearly seen that the oxidation of 1-phenylethanol according to the invention is performed at higher rates and with higher selectivities to hydrogen peroxide than the oxidation according to the prior art.

TABLE 1

Oxidation of 1-phenylethanol

| Example | Primary alcohol | Secondary alcohol/ primary alcohol and/or ether ratio w/w | Relative rate | Selectivity to $H_2O_2$ (%) |
|---|---|---|---|---|
| 1 (Compar) | | 100/0 | 1 | 29.3 |
| 2 | 2 (2-ethoxy ethoxy)ethanol | 50/50 | 5.6 | 56.0 |
| 3 | 1-octanol | 50/50 | 1.2 | 46.0 |
| 4 | 1-hexanol | 70/30 | 1.5 | 49.5 |
| 5 | 1-hexanol | 50/50 | 1.7 | 61.2 |
| 6 | 1,6-hexane-diol | 85/15 | 1.4 | 38.2 |
| 7 | 1,6-hexane-diol | 50/50 | 2.4 | 60.8 |
| 8 | 2-phenyl-ethanol | 70/30 | 1.5 | 46.8 |
| 9 | 2-phenyl-ethanol | 50/50 | 1.6 | 60.7 |
| 10 | Poly(ethylene oxide)* | 50/50 | 2.3 | — |
| 11 | Diethylene-glycol dimethyl ether | 50/50 | 5.5 | 98.0 |

*Molecular weight 600

EXAMPLES 12 AND 13

They are related to the oxidation of 1-phenylethanol admixed with 2-(2-ethoxyethoxy)ethanol (ether-primary alcohol) in comparison with the oxidation of 1-phenylethanol according to the prior art (in absence of primary alcohol and/or ethers). The oxidation was carried out according to the procedure described in the examples 1 to 11, but at a temperature of 325° C. The results are shown in table 2.

TABLE 2

Oxidation of 1-phenylethanol

| Example | 1-Phenyl-ethanol/2-(2-ethoxy-ethoxy)ethanol ratio, w/w | Relative rate | Selectivity to $H_2O_2$ (%) |
|---|---|---|---|
| 12 (Compar.) | 100/0 | 1 | 38.4 |
| 13 | 70/30 | 1.24 | 44.3 |

EXAMPLES 14 AND 15

These examples refer to the oxidation of 1-phenylethanol admixed with 2-(2-ethoxyethoxy)ethanol in comparison with the oxidation of 1-phenylethanol in the same conditions in the absence of primary alcohols and ethers (according to the prior art).

The oxidation was carried out with the procedure described in the examples 1 to 11, but at a temperature of 105° C. The results are shown in table 3.

TABLE 3

Oxidation of 1-phenylethanol

| Example | 1-Phenyl-ethanol/2-(2-ethoxy-ethoxy)ethanol ratio, w/w | Relative rate | Selectivity to $H_2O_2$ (%) |
|---|---|---|---|
| 14 (Compar.) | 100/0 | 3 | 52.7 |
| 15 | 70/30 | 7.84 | 94.1 |

EXAMPLES 16–17

These examples refer to the oxidation of an aliphatic secondary alcohol, 2-octanol, admixed with 2-(2-ethoxyethoxy)ethanol in comparison with the oxidation of 2-octanol in the same conditions according to the prior art. The oxidation was carried out with the procedure described in the examples 1 to 11. The results are shown in table 4.

TABLE 4

Oxidation of 2-octanol

| Example | 2-Octanol/ 2-(2-ethoxy-ethoxy)ethanol ratio (w/w) | Oxidation rate of 2-octanol, mol/h.l |
|---|---|---|
| 16 (Compar.) | 100/0 | 0.00 |
| 17 | 50/50 | 0.15 |

EXAMPLES 18–19

In an stirred type tank (Autoclave Engineers) equipped with a stirring system and capable of operating at pressure, 500 ml of 1-phenylethanol (example 18) or 500 ml of a 50/50 by weight. 1-phenylethanol/1-hexanol mixture (example 19) are charged. The stirring is started by means of a 2 screw stirring driven by an electrical motor of 600 r.p.m. The reactor liquids are heated until 110° C. and at that temperature the feeding of a nitrogen gaseous mixture (91%) and oxygen (9%) is started by means of a bubbler with a flow of 50 Nl/h. After maintaining the reaction mixture for 210 minutes at those conditions, the reactor is depressurized and the reaction mixture is cooled down until room temperature. Finally the reaction liquids are analyzed. The obtained results are shown in table 5.

TABLE 5

Oxidation of 1-phenylethanol

| Example | 1-Phenyl-ethanol/1-hexanol ratio, (w/w) | Relative rate | Selectivity to $H_2O_2$ (%) |
|---|---|---|---|
| 18 (Compar.) | 100/0 | 1 | 62 |
| 19 | 50/50 | 2.4 | 75 |

EXAMPLES 20–21

These examples refer to the oxidation of diphenylcarbinol admixed with the diethyleneglycol dimethyl ether in comparison with the oxidation of diphenylcarbinol in the same conditions in the absence of ether (prior art). The oxidation was carried out according to the procedure described in the examples 1 to 11 substituting the diphenylcarbinol instead of 1-phenylethanol. The results are shown in table 6.

TABLE 6

| Example | Diphenylcarbinol/diethyleneglycol dimethylether (w/w) | Relative rate | Selectivity $H_2O_2$ (%) |
|---|---|---|---|
| 20 (Compar.) | 100/0 | 1 | 1.77 |
| 21 | 50/50 | 6.6 | |

We claim:

1. A process for producing hydrogen peroxide, the process comprising oxidizing in a liquid phase a secondary alcohol admixed with a primary alcohol and/or an ether, wherein the secondary alcohol is oxidized with molecular oxygen.

2. A process according to claim 1, wherein a weight ratio of the secondary alcohol to the primary alcohol and/or the ether is between approximately 90/10 and 10/90.

3. A process according to claim 1, wherein the oxidation is carried out at a temperature between 60 and 160° C.

4. A process according to claim 1, wherein the oxidation is carried out at an overall pressure between approximately 1 and 40 kg/cm².

5. A process according to claim 1, wherein the primary alcohol and/or the ether does not contain tertiary hydrogen or benzyl atoms.

6. A process according to claim 1, wherein the secondary alcohol is 1-phenylethanol.

7. A process according to claim 2, wherein the oxidation is carried out at a temperature between 60–160° C.

8. A process according to claim 2, wherein the primary alcohol and/or the ether does not contain tertiary hydrogen or benzyl atoms.

9. A process according to claim 3, wherein the primary alcohol and/or the ether does not contain tertiary hydrogen or benzyl atoms.

10. A process according to claim 4, wherein the primary alcohol and/or the ether does not contain tertiary hydrogen or benzyl atom.

11. A process according to claim 2, wherein the secondary alcohol is 1-phenylethanol.

12. A process according to claim 3, wherein the secondary alcohol is 1-phenylethanol.

13. A process according to claim 4, wherein the secondary alcohol is 1-phenylethanol.

14. A process according to claim 5, wherein the secondary alcohol is 1-phenylethanol.

15. A process as claimed in claim 2, wherein the weight ratio is between 85/15 and 30/70.

16. A process as claimed in claim 3, wherein the temperature is between 80 and 140° C.

17. A process as claimed in claim 4, wherein the overall pressure is between 2 and 15 kg/cm².

18. A process as claimed in claim 7, wherein the temperature is between 80 and 140° C.

19. A process as claimed in claim 1, wherein the secondary alcohol has the following formula

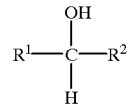

wherein $R^1$ and $R^2$ are the same or different, and wherein $R^1$ and $R^2$ are selected from the group consisting of alkyls, arylalkyls, and aryls.

20. A process as claimed in claim 19, wherein $R^1$ and $R^2$ are selected from the group consisting of $C_1$–$C_6$ alkyls, $C_6$–$C_{18}$ aryls, and $C_7$–$C_{20}$ arylalkyls.

21. A process as claimed in claim 19, wherein $R^1$ and $R^2$ are selected from the group consisting of methyl, ethyl, propyl, n-butyl, isobutyl, terbutyl, n-pentyl, isopentyl, 1-methylbutyl, 1-ethylpropyl, neopentyl, terpentyl, n-hexyl, isohexyl, phenyl, nitrophenyl, chlorophenyl, methoxyphenol, methylphenyl, dimethylphenyl, trimethylphenyl, naphthyl, naphthylphenyl, biphenyl, benzyl, and phenylethyl.

22. A process as claimed in claim 1, wherein the secondary alcohol is an aliphatic alcohol or an aromatic alcohol.

23. A process as claimed in claim 1, wherein the secondary alcohol is selected from the group consisting of 2-propanol, 2-butanol, 2-pentanol, 3-pentanol, 2-hexanol, 3-hexanol, 2-octanol, 3-octanol, 4-octanol, 3,3'-dimethylbutanol-2, diphenylmethanol, 1-phenylethanol, 1-phenylpropanol, 1-phenylpropanol-2, 1-phenylbutanol, 1-phenylbutanol-2, 4-phenylbutanol-2, and diphenylcarbinol.

24. A process as claimed in claim 1, wherein the primary alcohol is selected from the group consisting of linear $C_2$–$C_{16}$ primary aliphatic monoalcohols, branched $C_4$–$C_{16}$ primary aliphatic monoalcohols, aromatic alcohols, diols, and polyols.

25. A process as claimed in claim 1, wherein the primary alcohol is selected from the group consisting of ethanol, 1-propanol, 1-butanol, 1-pentanol, 1-hexanol, 1-octanol, 1-hexadecanol, 2-methylpentanol, 2,2-dimethylpropanol, 3-methylbutanol, 2-ethylhexanol, 2,2,4-trimethylpentanol, 2-phenylethanol, 2-phenylpropanol, 3-phenylpropanol, 1,4-butanodiol, 1,6-hexanodiol, and 1,1,1-tris(hydroxymethyl) propane.

26. A process as claimed in claim 1, wherein the ether is selected from the group consisting of aliphatic ethers, ethyleneglycol ethers, diethyleneglycol ethers, triethyleneglycol ethers, propyleneglycol ethers, dipropyleneglycol ethers, tripropyleneglycol ethers, cyclic ethers, crown ethers, aromatic ethers, polymeric ethers, ethers containing functional groups of primary alcohol types, and ester groups-containing ethers.

27. A process as claimed in claim 1, wherein the ether is selected from the group consisting of diethyl ether; di-n-butyl ether; ethyleneglycol dipropylether; ethyleneglycol dihexylether; ethyleneglycol diphenylether; diethleneglycol dimethylether; diethyleneglycol dibutylether; triethyleneglycol dimethylether; triethyleneglycol dibutylether; propyleneglycol diphenylether; dipropyleneglycol diethylether; tripropyleneglycol dimethylether; tetrahydrofuran; dioxane, 1,3-dioxolane as well as their alkyl and aryl derivatives; dibenzyl ether and its alkyl and aryl derivatives; poly(ethylene oxide); poly(propylene oxide); poly(ethylene oxide-co-propylene oxide); 2-ethoxyethanol; 2-(2-ethoxyethoxy)ethanol; diethyleneglycol diacetate; diethyleneglycol monoacetate; and triethyleneglycol benzoate.

28. A process as claimed in claim 1, wherein the oxidation occurs in the presence of a peroxide stabilizing agent selected from the group consisting of alkaline metal salts, alkaline metal hydroxides, sodium stannate, sodium pyrophosphate, organic phosphonates, ethylenediaminotetraacetic acid (EDTA), dipicolinic acid, benzoic acid, aminotri(methylenephosphonic) acid, 1-hydroxyethylidene-1, 1-diphosphonic acid, ethylenediaminotetra(methylenephosphonic) acid, pyrophosphonic acid, and their salts.

* * * * *